(12) United States Patent
Crothers et al.

(10) Patent No.: US 9,556,799 B2
(45) Date of Patent: Jan. 31, 2017

(54) SYSTEM AND METHOD FOR OPERATING A GAS TURBINE

(71) Applicant: General Electric Company, Schenectady, NY (US)

(72) Inventors: Sarah Lori Crothers, Greenville, SC (US); Scott Arthur Day, Greenville, SC (US)

(73) Assignee: General Electric Company, Schenectady, NY (US)

(*) Notice: Subject to any disclaimer, the term of this patent is extended or adjusted under 35 U.S.C. 154(b) by 523 days.

(21) Appl. No.: 14/170,702

(22) Filed: Feb. 3, 2014

(65) Prior Publication Data
US 2015/0219016 A1 Aug. 6, 2015

(51) Int. Cl.
*F02C 9/28* (2006.01)
(52) U.S. Cl.
CPC ........... *F02C 9/28* (2013.01); *F05D 2270/083* (2013.01)
(58) Field of Classification Search
CPC combination set(s) only.
See application file for complete search history.

(56) References Cited

U.S. PATENT DOCUMENTS

| | | | |
|---|---|---|---|
| 6,464,489 B1* | 10/2002 | Gutmark | F02B 51/06 431/1 |
| 6,625,569 B2 | 9/2003 | James et al. | |
| 7,278,266 B2 | 10/2007 | Taware et al. | |
| 7,337,057 B2 | 2/2008 | Norman et al. | |
| 7,451,601 B2 | 11/2008 | Taware et al. | |
| 7,503,177 B2 | 3/2009 | Bland et al. | |
| 7,620,461 B2 | 11/2009 | Frederick, II et al. | |
| 7,693,147 B2 | 4/2010 | Williams et al. | |
| 7,739,999 B2 | 6/2010 | Kang et al. | |
| 7,743,599 B2 | 6/2010 | Taware et al. | |
| 7,908,072 B2 | 3/2011 | Tonno et al. | |
| 2006/0041368 A1 | 2/2006 | Williams et al. | |
| 2010/0313568 A1* | 12/2010 | Davis, Jr. | F23R 3/002 60/725 |

* cited by examiner

*Primary Examiner* — David Walczak
(74) *Attorney, Agent, or Firm* — Charlotte C. Wilson; Ernest G. Cusick; Frank A. Landgraff

(57) ABSTRACT

A system for operating a gas turbine includes a controller configured to execute logic stored in a memory that causes the controller to determine a frequency, a coherence and, optionally, a phase and/or an amplitude, of a combustion instability; to compare the frequency and the coherence, and, optionally, the phase and/or the amplitude, of the combustion instability to a respective predetermined limit; and to adjust at least one parameter of the gas turbine if the frequency, the coherence, and, optionally, the phase and/or the amplitude of the combustion instability is actionable relative to the respective predetermined limit. A related method of operating the gas turbine is also disclosed.

16 Claims, 7 Drawing Sheets

SYSTEM AND METHOD FOR OPERATING A GAS TURBINE

TECHNICAL FIELD

The present invention generally involves a system and method for operating a gas turbine. In particular embodiments, the system and method may be incorporated into the gas turbine or other turbomachine to detect the possibility of and/or reduce unwanted vibrations in hot gas path components downstream from a combustion system, resulting from in-phase, coherent combustion tones.

BACKGROUND

Combustors are commonly used in industrial and commercial operations to ignite fuel to produce combustion gases having a high temperature and pressure. For example, gas turbines and other turbomachines typically include one or more combustors to generate power or thrust. A typical gas turbine used to generate electrical power includes an axial compressor at the front, multiple combustors around the middle, and a turbine at the rear. Ambient air enters the compressor as a working fluid, and the compressor progressively imparts kinetic energy to the working fluid to produce a compressed working fluid at a highly energized state. The compressed working fluid exits the compressor and flows through one or more fuel injectors in the combustors where the compressed working fluid mixes with fuel before igniting to generate combustion gases having a high temperature and pressure. The combustion gases flow to the turbine where they expand to produce work. For example, expansion of the combustion gases in the turbine may rotate a shaft connected to a generator to produce electricity.

At particular operating conditions, combustion dynamics at specific frequencies and with sufficient amplitudes, which are in phase and coherent, may produce undesirable sympathetic vibrations in the turbine and/or other downstream components. In the context of this invention, coherence refers to the strength of the linear relationship between two (or more) dynamic signals, which is strongly influenced by the degree of frequency overlap between them. Typically, this problem is managed by combustor tuning which limits the amplitude of the combustion dynamics in a particular frequency band. However, combustor tuning may unnecessarily limit the operating range of the combustor.

Altering the frequency, coherence, phase, and/or amplitude of the combustors may reduce unwanted vibrations of the turbine and/or other downstream components. One approach to reducing unwanted combustion-driven vibrations in downstream components is to alter the coherence of the combustion system. For instance, as the frequency of the combustion dynamics in one or more, but not all, combustors is driven away from that of the other combustors, coherence and, therefore, modal coupling of the combustion dynamics of the combustors is reduced, which, in turn, reduces the ability of the combustor tone to cause a vibratory response in downstream components. Alternatively, shifting the combustion dynamics frequency of each of the combustors away from the natural frequency of the downstream components may also reduce unwanted vibrations of downstream components.

Therefore, a system and method for operating a gas turbine that detects the possibility of unwanted vibrations in downstream components and/or reduces such unwanted vibrations by altering the frequency, phase, amplitude, and/ or coherence between combustors would be useful for enhancing the thermodynamic efficiency of the combustors, protecting against accelerated wear, promoting flame stability, and/or reducing undesirable emissions over a wide range of operating levels, without detrimentally impacting the life of the downstream hot gas path components.

SUMMARY

Aspects and advantages of the invention are set forth below in the following description, or may be obvious from the description, or may be learned through practice of the invention.

One embodiment of the present invention is a system for operating a gas turbine, which includes: a compressor section configured to receiving a working fluid and to produce a compressed working fluid; and a plurality of combustors downstream from the compressor section, wherein each combustor includes a fuel injector that receives fuel at a fuel temperature and a fuel flow rate. A controller is configured to execute logic stored in a memory that causes the controller: to determine at least a frequency of a combustion instability and a coherence of a combustion instability; to compare the frequency of the combustion instability to a predetermined frequency limit and the coherence of the combustion instability to a predetermined coherence limit; and to adjust at least one parameter of the gas turbine if the frequency of the combustion instability is actionable relative to the predetermined frequency limit and the coherence of the combustion instability is actionable relative to the predetermined coherence limit.

A method for operating a gas turbine includes: determining a frequency of a combustion instability, and comparing the frequency of the combustion instability to a predetermined frequency limit. The method further includes: determining a coherence of a combustion instability, and comparing the coherence of the combustion instability to a predetermined coherence limit. If the frequency of the combustion instability is actionable relative to the predetermined frequency limit, and the coherence of the combustion instability is actionable relative to the predetermined coherence limit, the method adjusts at least one parameter of the gas turbine.

According to other embodiments, the system or method may further include comparing one of the frequency and the coherence of the combustion instability to a predetermined time limit. In this or other embodiments, the system or method may further be employed to determine the amplitude and/or the phase of the combustion instability; to compare the amplitude to a predetermined amplitude limit and/or to compare the phase to a predetermined phase limit, and to adjust at least one parameter of the gas turbine is at least one of the amplitude and the phase of the combustion instability is actionable relative to a predetermined limit.

The parameters being adjusted by the system or through the practice of the method may include one or more of: a temperature of the compressed working fluid; a flow rate of the working fluid; a flow rate of the compressed working fluid recirculated through the compressor section; the fuel flow rate of the fuel to at least one injector; and the fuel temperature of the fuel to at least one injector.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION

Figure 1:
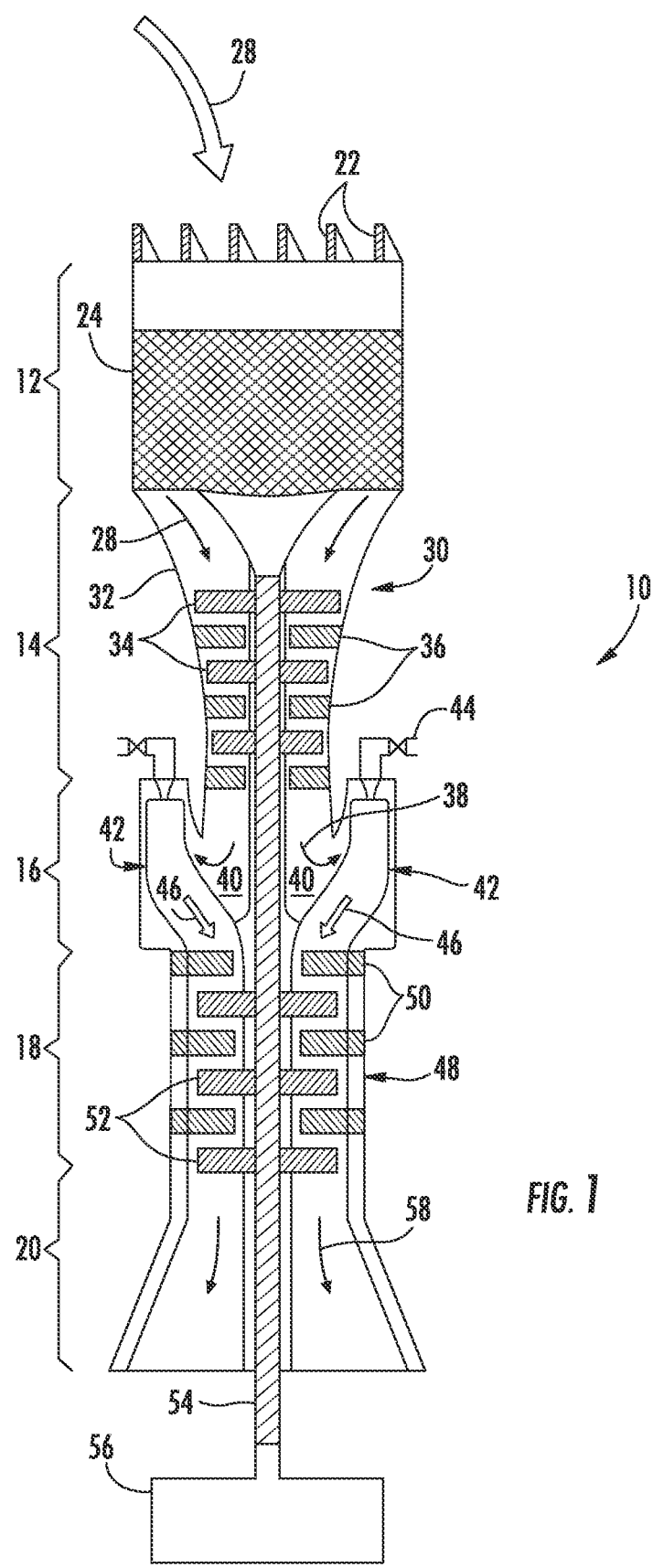
FIG. 1 is a simplified side cross-sectional view of an exemplary gas turbine according to various embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify either the location or the importance of the individual components.

The terms "upstream," "downstream," "radially," and "axially" refer to the relative direction with respect to fluid flow in a fluid pathway. For example, "upstream" refers to the direction from which the fluid flows, and "downstream" refers to the direction to which the fluid flows. Similarly, "radially" refers to the relative direction substantially perpendicular to the fluid flow, and "axially" refers to the relative direction substantially parallel to the fluid flow.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include a system and method for operating a gas turbine to detect the possibility of unwanted vibrations in hot gas path components downstream from the combustion system and/or reduce such unwanted vibrations, which may result from in-phase, coherent combustion tones. The system and method may be implemented in a gas turbine having multiple combustors, and each combustor may include one or more fuel injectors for mixing fuel with a compressed working fluid prior to combustion. The system and method may further include a controller configured to execute logic stored in a memory that causes the controller to determine a frequency, a coherence, and, optionally, a phase and/or an amplitude, of one or more combustion instabilities; to compare the frequency, the coherence, and, optionally, the phase and/or the amplitude, of the one or more combustion instabilities to a predetermined limit; and adjust at least one parameter of the gas turbine if the frequency, the coherence, and, optionally, the phase and/or the amplitude, of the one or more combustion instabilities is actionable relative to the predetermined limit.

As used herein, the phrase "actionable relative to the predetermined limit" is dependent on the particular parameter being compared. Specifically, this phrase means that the parameter is either within a designated range (e.g., for frequency), less than a lower predetermined limit (e.g., for phase), or greater than an upper predetermined limit (e.g., for coherence or amplitude). It is to be understood that, in various embodiments, two, three, or four characteristics may be determined to be actionable relative to their predetermined limits before the system (or method) performs an action.

The system and method may adjust at least one parameter in response to the detection of a condition that is actionable relative to the predetermined limit. For example, the system and method may adjust a temperature, pressure, and/or flow rate of a compressed working fluid produced by a compressor section of the gas turbine. Alternately, or in addition, the system and method may adjust a fuel flow and/or fuel temperature to one or more fuel circuits in one or more of the combustors. As a result, various embodiments of the present disclosure may reduce the ability of the combustor tone to cause a vibratory response in downstream components.

Although exemplary embodiments of the present invention will be described generally in the context of the combustion dynamics in a gas turbine for purposes of illustration, one of ordinary skill in the art will readily appreciate that embodiments of the present disclosure may be applied to any combustion dynamics and are not limited to a gas turbine unless specifically recited in the claims.

Referring now to the drawings, FIG. 1 provides a simplified side cross-sectional view of an exemplary gas turbine 10 that may incorporate various embodiments of the present disclosure. As shown, the gas turbine 10 may generally include an inlet section 12, a compressor section 14, a combustion section 16, a turbine section 18, and an exhaust section 20. The inlet section 12 may include a series of filters 22 and one or more fluid conditioning devices 24 to clean, heat, cool, moisturize, de-moisturize, and/or otherwise condition a working fluid 28 (e.g., air) entering the gas turbine 10. The cleaned and conditioned working fluid 28 flows to a compressor 30 in the compressor section 14. A compressor casing 32 contains the working fluid 28, as alternating stages of rotating blades 34 and stationary vanes 36 progressively accelerate and redirect the working fluid 28 to produce a continuous flow of compressed working fluid 38 at a higher temperature and pressure.

The majority of the compressed working fluid 38 flows through a compressor discharge plenum 40 to one or more combustors 42 in the combustion section 16. A fuel supply 44 in fluid communication with each combustor 42 supplies a fuel to each combustor 42. Possible fuels may include, for example, blast furnace gas, coke oven gas, natural gas, methane, vaporized liquefied natural gas (LNG), hydrogen, syngas, butane, propane, olefins, diesel, petroleum distillates, and combinations thereof. The compressed working fluid 38 mixes with the fuel and ignites to generate combustion gases 46 having a high temperature and pressure.

The combustion gases 46 flow along a hot gas path through a turbine 48 in the turbine section 18 where they expand to produce work. Specifically, the combustion gases 46 may flow across alternating stages of stationary nozzles 50 and rotating buckets 52 in the turbine 48. The stationary nozzles 50 redirect the combustion gases 46 onto the next stage of rotating buckets 52, and the combustion gases 46 expand as they pass over the rotating buckets 52, causing the rotating buckets 52 to rotate. The rotating buckets 52 may connect to a shaft 54 that is coupled to the compressor 30 so that rotation of the shaft 54 drives the compressor 30 to produce the compressed working fluid 38. Alternately or in addition, the shaft 54 may connect to a generator 56 for producing electricity. Exhaust gases 58 from the turbine section 18 flow through the exhaust section 20 prior to release to the environment.

Figure 2:
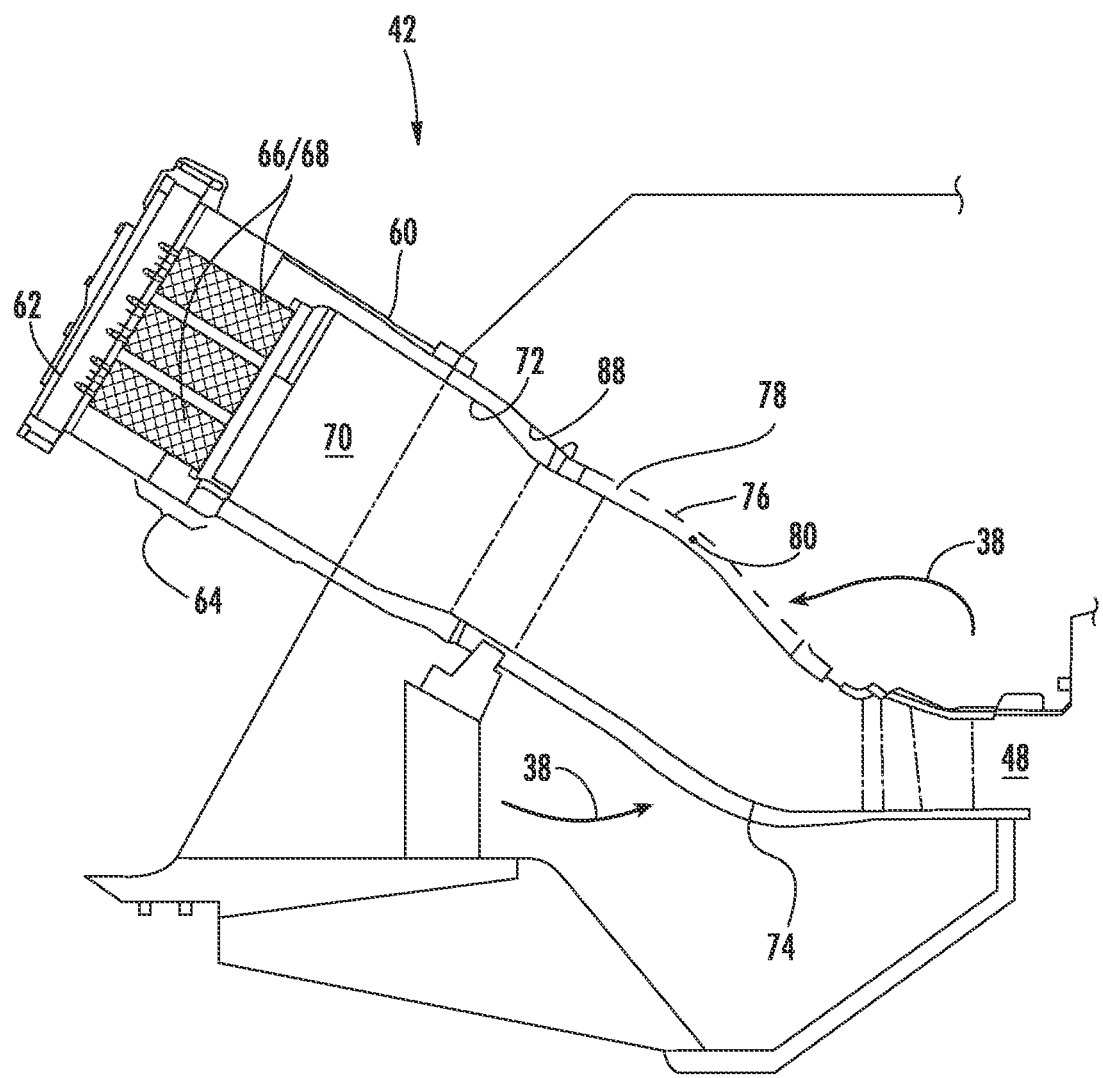
FIG. 2 is a simplified side cross-sectional view of an exemplary combustor according to various embodiments of the present disclosure.

FIG. 2 provides a simplified side cross-section view of an exemplary combustor 42 according to various embodiments of the present invention. As shown in FIG. 2, a combustor casing 60 and an end cover 62 may combine to contain the compressed working fluid 38 flowing to the combustor 42. A cap assembly 64 may extend radially across at least a portion of the combustor 42, and one or more fuel injectors 66, 68 may be radially arranged across the cap assembly 64 to supply fuel to a combustion chamber 70 downstream from the cap assembly 64. A liner 72 may circumferentially surround at least a portion of the combustion chamber 70, and a transition duct 74 downstream from the liner 72 may connect the combustion chamber 70 to the inlet of the turbine 48. An impingement sleeve 76 with flow holes 78 may circumferentially surround the transition duct 74, and a flow sleeve 88 may circumferentially surround the liner 72. With these features, the compressed working fluid 38 may pass through the flow holes 78 in the impingement sleeve 76 to flow through an annular passage 80 outside of the transition duct 74 and liner 72. When the compressed working fluid 38 reaches the end cover 62, the compressed working fluid 38 reverses direction to flow through the fuel injectors 66 and into the combustion chamber 70. The combustors 42 may be any type of combustor known in the art, and the present disclosure is not limited to any particular combustor design unless specifically recited in the claims.

Figure 3:
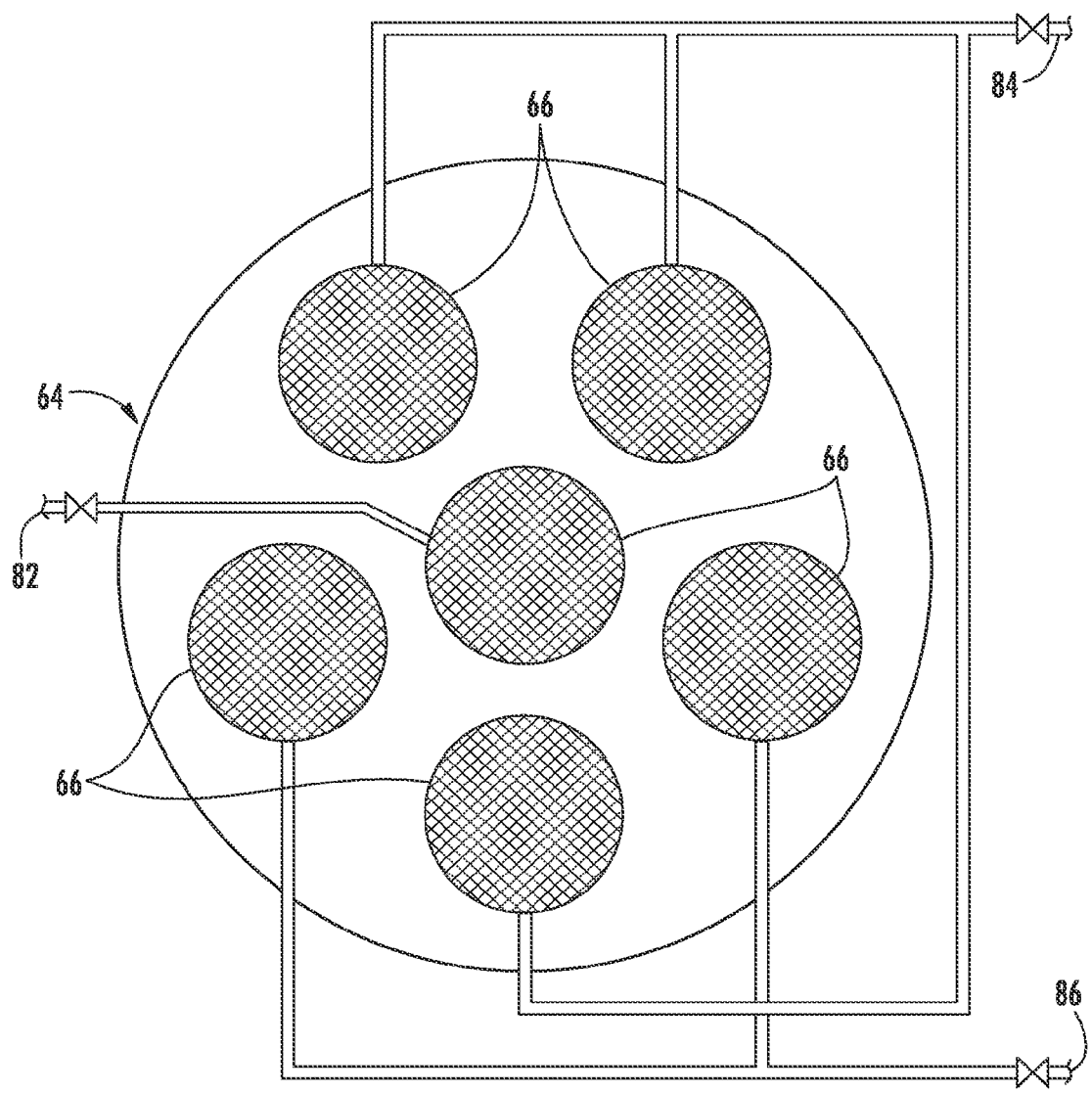
FIG. 3 is an upstream plan view of the cap assembly shown in FIG. 2 according to an embodiment of the present disclosure.
Figure 4:
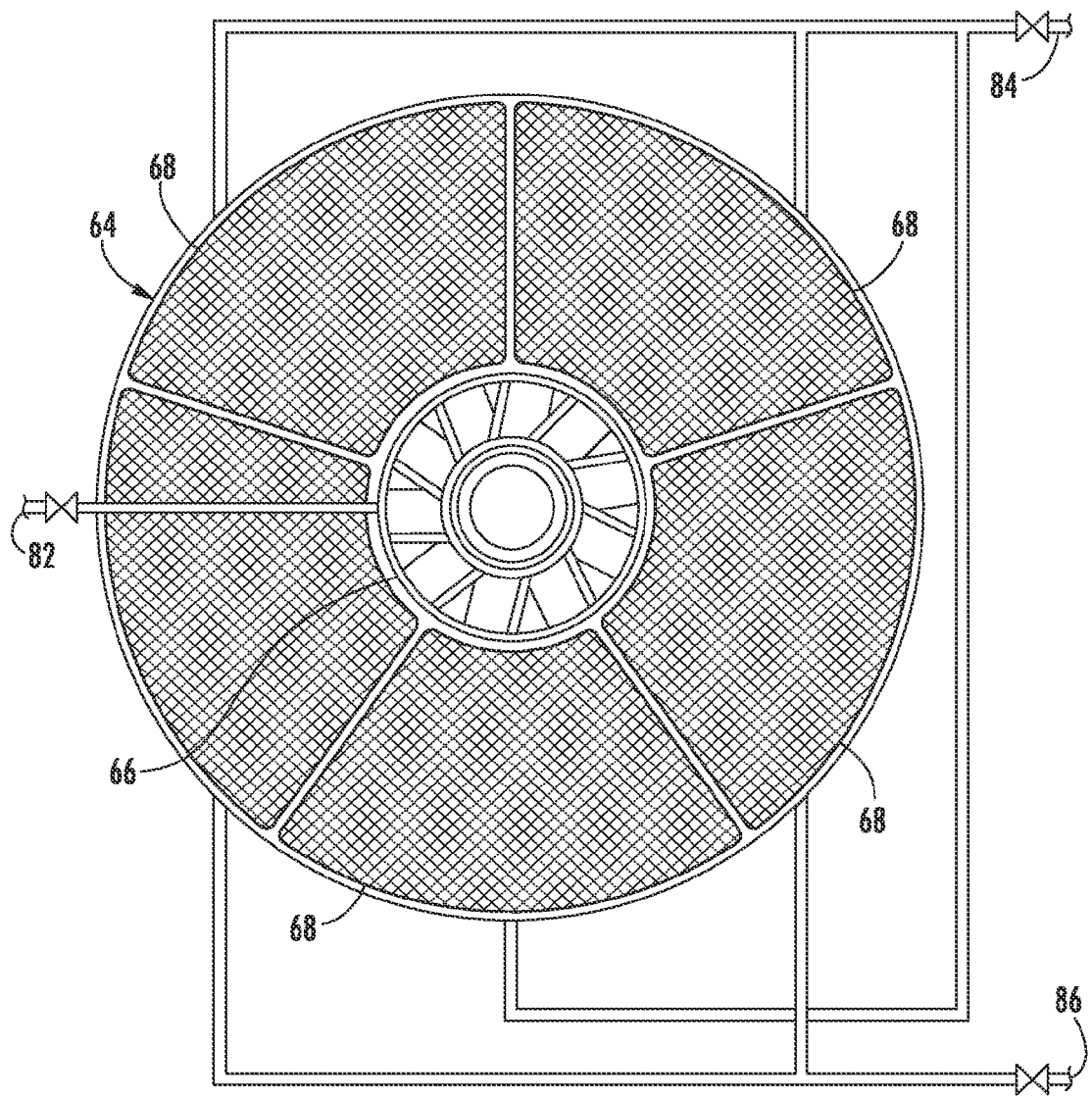
FIG. 4 is an upstream plan view of the cap assembly shown in FIG. 2 according to an alternate embodiment of the present disclosure.

FIGS. 3 and 4 provide upstream plan views of exemplary arrangements of the fuel injectors 66, 68 in the cap assembly 64 within the scope of the present disclosure. As shown in FIG. 3, for example, multiple fuel injectors 66 may be radially arranged around a single fuel injector 66. Alternatively, a plurality of non-circular, truncated pie-shaped fuel injectors 68 may circumferentially surround a single circular fuel injector 66, as shown in FIG. 4.

Although generally shown as cylindrical (in FIGS. 2 and 3), the radial cross-section of the fuel injectors 66, 68 may be any geometric shape, and the present disclosure is not limited to any particular radial cross-section unless specifically recited in the claims. One of ordinary skill in the art will readily appreciate multiple other shapes and arrangements for the fuel injectors 66, 68 from the teachings herein, and the particular shape and arrangement of the fuel injectors 66, 68 are not limitations of the present invention unless specifically recited in the claims. In addition, various embodiments of the combustor 42 may include different numbers and arrangements of fuel injectors 66, 68 in the cap assembly 64.

The fuel injectors 66, 68 may be divided into various groups or circuits to facilitate multiple fueling regimes over a wide range of operations. In the exemplary arrangements shown in FIGS. 3 and 4, the center fuel injector 66 and/or one of the outer fuel injectors 66, 68 may receive fuel from a first fuel circuit 82, while one or more of the surrounding fuel injectors 66, 68 may be grouped to receive the same or a different fuel from a second and/or third fuel circuit 84, 86. During base load operations, fuel may be supplied to each fuel injector 66, 68 via one of the three fuel circuits 82, 84, 86, while fuel flow may be reduced or completely eliminated from one or more of the fuel injectors 66, 68 during reduced or turndown operations. Altering the fuel split to each fuel circuit 82, 84, 86 in one or more combustors 42 may alter the frequency, phase, amplitude, and/or coherence of the combustion dynamics.

An overlap between the frequency of the combustion dynamics and the downstream component resonant frequency may result in unwanted vibration of the downstream components when an in-phase and coherent relationship between the combustion dynamics frequencies of two or more combustors 42 exists. Various embodiments of the present disclosure seek to detect the possibility of unwanted vibrations in hot gas path components downstream from the combustion system and/or to reduce such unwanted vibrations by determining a frequency, a coherence, and, optionally, a phase and/or an amplitude, of one or more combustion instabilities; comparing the frequency, the coherence, and, optionally, the phase and/or amplitude, of the one or more combustion instabilities to a predetermined limit; and adjusting at least one parameter of the gas turbine if the frequency, the coherence, and, optionally, the phase and/or the amplitude, of the one or more combustion instabilities is actionable relative to the predetermined limit. In this manner, the embodiments of the present disclosure may detect and/or reduce unwanted vibrations in hot gas path components downstream from the combustion system over a wide range of operating levels.

Figure 5:
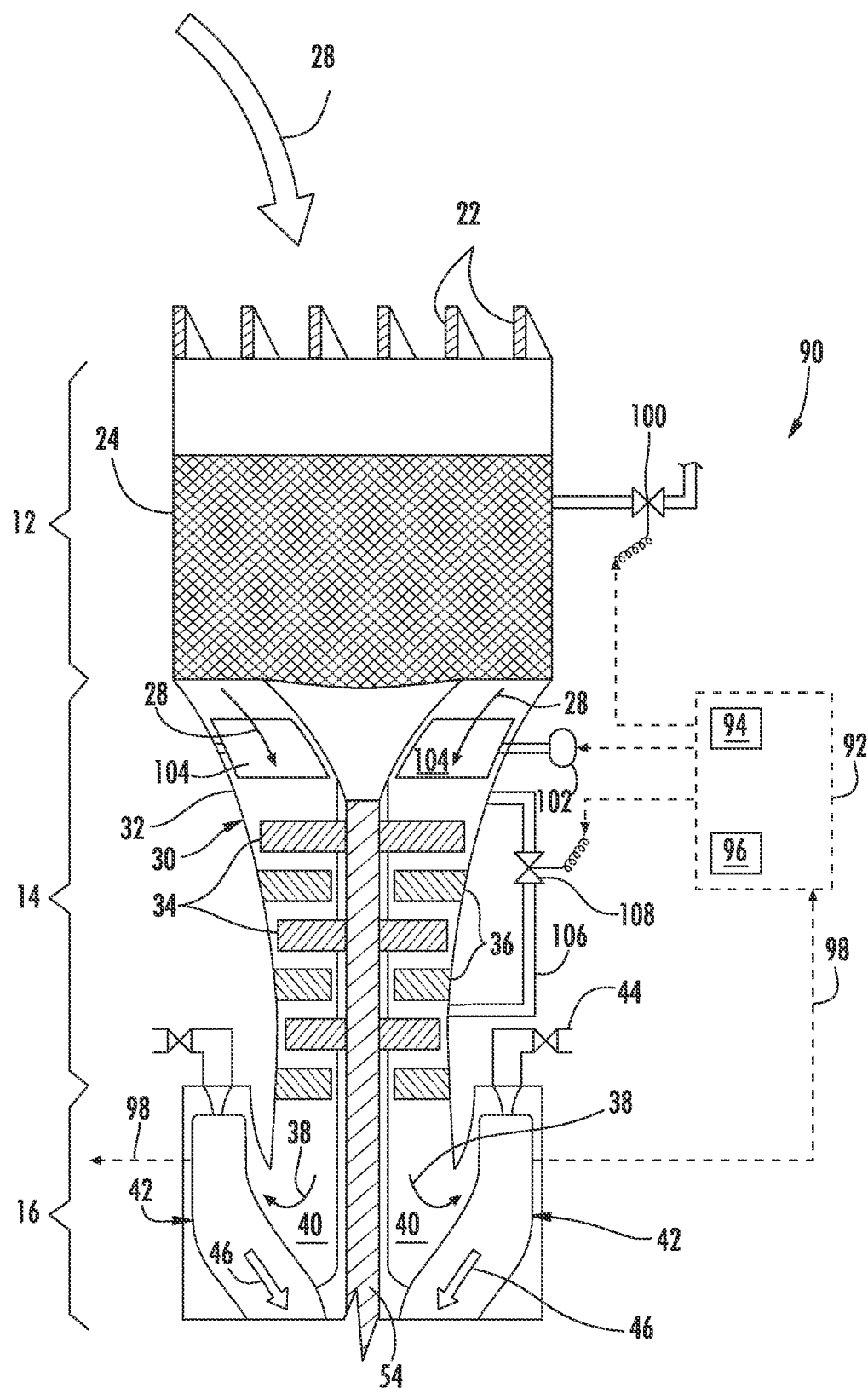
FIG. 5 is a simplified side cross-section view of a system according to various embodiments of the present disclosure.

FIG. 5 provides a simplified cross-sectional view of a system 90 for operating the combustors 42, according to various embodiments of the present disclosure. As shown in FIG. 5, the system 90 may be incorporated into the gas turbine 10 (previously described with respect to FIG. 1) and may include a controller 92 configured to execute logic 94 stored in a memory 96.

The controller 92 may generally be any suitable processing device known in the art, and the memory 96 may generally be any suitable computer-readable medium or media, including, but not limited to, RAM, ROM, hard drives, flash drives, or other memory devices. As is generally understood, the memory 96 may be configured to store information accessible by the controller 92, including instructions or logic 94 that can be executed by the controller 92. The instructions or logic 94 may be any set of instructions that when executed by the controller 92 cause the controller 92 to provide the desired functionality.

For instance, the instructions or logic 94 may be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits.

The technical effect of the controller 92 is to execute the logic 94 stored in the memory 96 to cause the controller 92 to determine the frequency, the coherence and, optionally, the phase and/or the amplitude of one or more combustion instabilities. For example, the controller 92 may receive a dynamic pressure signal 98 from each combustor 42, and the logic 94 may enable the controller 92 to calculate the frequency and/or amplitude of each combustion instability for each combustor 42. In addition, the logic 94 may enable the controller 92 to calculate the average or median frequency, phase, amplitude, and/or coherence of some or all of the combustors 42.

The method by which average or median values are determined may vary for different combustion instabilities and for different types of combustors 42. For example, the average or median coherence may be determined as the average or median of the coherence, or the square root of the coherence, measured (a) for one or more combustion instability, (b) between one or more pairs of adjacent combustors 42, (c) between one or more pairs of combustors 42, and/or (d) for one or more combustors 42 with respect to a predetermined reference combustor 42. It has been found that the square root of coherence functions as an adequate surrogate for the coherence itself and may simplify certain computational processes.

Similarly, the average or median phase may be determined as the average or median of the absolute value of the phase measured (a) for one or more of the combustion instabilities, (b) between one or more pairs of adjacent combustors 42, (c) between one or more pairs of combustors 42, and/or (d) for one or more combustors 42 with respect to a predetermined reference combustor 42.

It is important to note that a dynamic pressure signal is not required for all combustors. Certainly, it is beneficial to have a dynamic pressure signal from each combustor. However, in the event that the dynamic pressure signal is identified as faulty or unavailable for one or more combustors 42, the dynamic pressure signal may be excluded from the determination of average or median phase and/or coherence.

The logic 94 may further cause the controller 92 to compare the frequency, the coherence, and, optionally, the phase and/or the amplitude, of the one or more combustion instabilities to a predetermined limit; and to adjust at least one parameter of the gas turbine 10 if the frequency, the coherence, and, optionally, the phase and/or the amplitude, of the one or more combustion instabilities is actionable relative to the predetermined limit.

As used herein, the phrase "actionable relative to the predetermined limit" is dependent on the particular parameter being compared and means that the parameter is either within a designated range (e.g., for frequency), less than a lower predetermined limit (e.g., for phase), or greater than an upper predetermined limit (e.g., for coherence or amplitude). It is to be understood that, in various embodiments, two, three, or four characteristics may be determined to be actionable relative to their predetermined limits before the system (or method) performs an action. The predetermined limits may vary for different combustion instability frequencies for each combustor 42 and may vary for different combustor 42 and gas turbine 10 configurations. Therefore, it should be understood that the predetermined limits for frequency, phase, amplitude, and coherence may be set to any value.

In an exemplary embodiment, if the frequency is actionable relative to the predetermined frequency limit by being within the designated frequency range, the phase is actionable relative to the predetermined phase limit by being less than the predetermined phase limit, the amplitude is actionable relative to the predetermined amplitude limit by being greater than the predetermined amplitude limit, and/or the coherence is actionable relative to the predetermined coherence limit by being greater than the predetermined coherence limit, then the system 90 may take corrective action to reduce unwanted vibrations in hot gas path components downstream from the combustion system.

One particular method contemplated herein includes the determination of each of the frequency, amplitude, phase, and coherence, prior to adjusting any parameter of the gas turbine, since a determination of these four characteristics provides the most information with respect to the behavior of the combustion dynamics of the combustors 42. However, for some configurations, such as those of a mature fleet with significant operating experience, it may be possible to adjust a parameter of the gas turbine based only on a determination of frequency and coherence. In this instance, the additional operating experience may provide pre-existing knowledge of the phase, such that the phase characteristics can be assumed, as opposed to being determined as part of the present method.

The system 90 may include various means for adjusting at least one parameter of the gas turbine 10 if the frequency, the coherence, and, optionally, the phase and/or the amplitude, of the one or more combustion instabilities is actionable relative to the predetermined limits of frequency, coherence, and, optionally, phase and/or amplitude. For example, a change in the temperature, pressure, and/or flow rate of the compressed working fluid 38 produced by the compressor section 14 directly affects the frequency and/or amplitude of each combustor 42. In turn, a change in the frequency and/or amplitude may change the phase and/or coherence of the combustion section 16. The system 90 may include various mechanisms for changing the temperature, pressure, and/or flow rate of the compressed working fluid 38 produced by the compressor section 14.

The temperature of the working fluid 28 entering the compressor section 14 may be changed using evaporative cooling, heat exchangers, chillers, or other temperature-altering devices known in the art. In one particular embodiment shown in FIG. 5, a valve 100 (such as a control valve, a throttle valve, a thermostatic expansion valve, or other suitable flow control device) is operably connected to the one or more fluid conditioning devices 24 in the inlet section 12. In this instance, the fluid conditioning devices 24 are temperature-altering devices, such as heat exchangers, chillers, or evaporative coolers. The controller 92 may reposition the valve 100 to either increase or decrease heating or cooling provided to the working fluid 28 flowing through the inlet section 12. In this manner, the temperature of the working fluid 28 entering the compressor section 14 may be varied, which in turn varies the temperature, pressure, and/or flow rate of the compressed working fluid 38 produced by the compressor section 14.

In a second embodiment shown in FIG. 5, the flow rate of the compressed working fluid 38 produced by the compressor section 14 may be changed by changing a flow rate of the working fluid 28 entering the compressor section 14. As shown in FIG. 5, the system 90 includes an actuator 102 or other operator operably connected to one or more inlet guide vanes 104 installed in the compressor 30. The controller 92 may reposition the actuator 102 to either open or close the inlet guide vanes 104, thereby increasing or decreasing (respectively) the flow rate of the working fluid 28 entering the compressor section 14.

In alternate embodiments, one or more sets of stationary vanes 36 having variable positions, also known as variable stator vanes (not shown), may be used to vary the flow rate of the working fluid 28 through the compressor 30. In this configuration, the flow rate of the working fluid 28 through the compressor 30 may be varied or altered, which consequently changes the temperature, pressure, and/or flow rate of the compressed working fluid 38 produced by the compressor section 14.

FIG. 5 provides a third example of a suitable structure for changing the temperature, pressure, and/or flow rate of the compressed working fluid 38 produced by the compressor section 14. In this example, the system 90 includes a conduit 106 (or pipe or other fluid connection) positioned between a downstream portion of the compressor 30 and the inlet of the compressor 30. The controller 92 may reposition a valve 108 (such as a control valve, a throttle valve, a thermostatic expansion valve, or other suitable flow control device) to either increase or decrease the flow rate of the compressed working fluid 38 diverted through the conduit 106 to recirculate through the compressor section 14. In alternate embodiments, the system 90 may include an additional heat exchanger (not shown) operably connected to the conduit 106 to either heat or cool the compressed working fluid 38 recirculated through the compressor section 14. In this manner, the flow rate and/or temperature of the compressed working fluid 38 recirculated through the compressor section 14 may be varied, which therefore varies the temperature, pressure, and/or flow rate of the compressed working fluid 38 produced by the compressor section 14.

Figure 6:
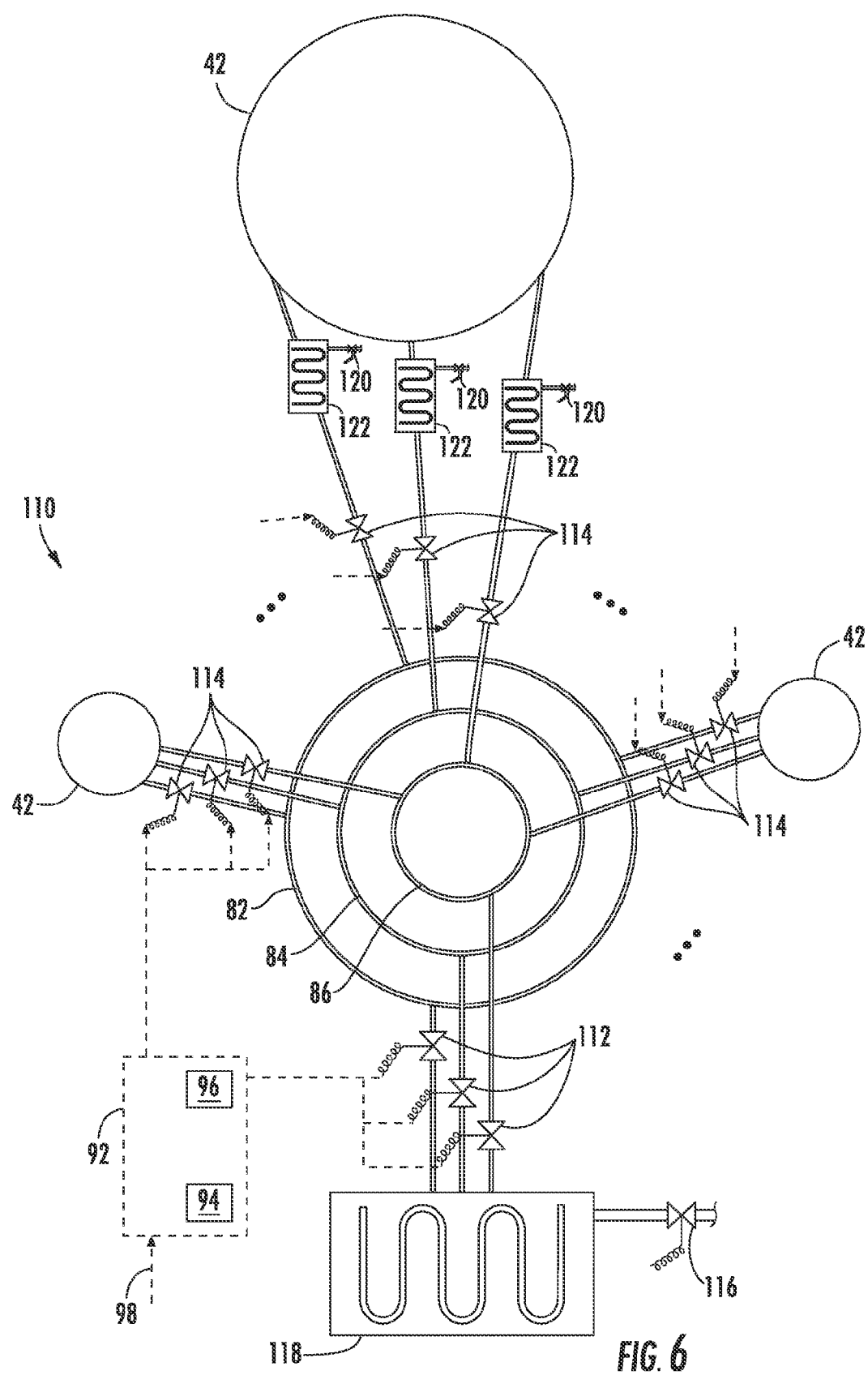
FIG. 6 is a diagram of a system according to alternate embodiments of the present disclosure.

Another way to change the frequency, phase, amplitude, and/or coherence of each combustor 42 is to change the fuel flow and/or fuel temperature to one or more of the fuel circuits 82, 84, 86 in one or more combustors 42. FIG. 6 provides a diagram of such a system 110 for changing the combustion instability frequency and/or amplitude of one or more combustors 42 by changing the fuel flow and/or fuel temperature in one or more fuel circuits 82, 84, 86 in one or more combustors 42, according to alternate embodiments of the present disclosure.

Specifically, a change in the fuel pressure ratio (i.e., combustor pressure-to-fuel pressure) and/or equivalence ratio resulting from differences in the fuel flow rate and/or fuel temperature may directly affect the combustion instability frequency and/or amplitude in each combustor 42. As the frequency of the combustion dynamics in one or more, but not all, combustors 42 is driven away from that of the other combustors 42, modal coupling of the combustion dynamics and, therefore, the coherence of the combustors 42 is reduced, which thereby reduces the ability of the combustor tone to cause a vibratory response in downstream components. In addition, shifting the combustion dynamics frequency of each of the combustors 42 away from the natural frequency of the downstream components may also reduce unwanted vibrations of downstream components.

As shown in FIG. 6, the system 110 may be incorporated into the gas turbine 10 previously described with respect to FIG. 1 and may include various mechanisms for changing the combustion instability frequency in one or more combustors 42 by changing the fuel flow to one or more of the fuel circuits 82, 84, 86 in one or more combustors 42. Although only three combustors 42 are shown in FIG. 6, the present invention is not limited to any specific number of combustors 42, unless specifically recited in the claims.

In one particular embodiment shown in FIG. 6, the fuel flow to one or more of the combustors 42 may be changed using a valve 112 (such as a control valve, a throttle valve, or other suitable flow control device) operably connected to one or more of the fuel circuits 82, 84, 86 that supply fuel to the combustors 42. The controller 92 may reposition each valve 112 in the respective fuel circuits 82, 84, 86 to increase or decrease the fuel flow into one or more of the fuel circuits 82, 84, 86.

In other particular embodiments, the fuel flow from the one or more fuel circuits 82, 84, 86 to one or more individual combustors 42 may be changed. In this embodiment, individual valves 114 (such as control valves, throttle valves, or other suitable flow control devices) are operably connected in one or more of the fuel circuits 82, 84, 86 upstream from individual combustors 42. The controller 92 may reposition each individual control valve 114 to change the fuel flow through one or more fuel circuits 82, 84, 86 to one or more combustors 42, thus changing the fuel flow to the fuel injectors 66, 68 in one or more individual combustors 42.

One of ordinary skill in the art will readily appreciate from the teachings herein that the individual valves 114 in one or more fuel circuits 82, 84, 86 may be present in addition to, or instead of, the valves 112 in the respective fuel circuits 82, 84, 86 previously described. According to this aspect of the present disclosure, the fuel flow from one or more fuel circuits 82, 84, 86 may be varied to one or more fuel injectors 66, 68 and/or combustors 42 to change the frequency, phase, amplitude, and/or coherence of one or more combustors 42.

In yet another particular embodiment shown in FIG. 6, the combustion instability frequency in one or more combustors 42 may be changed by changing the fuel temperature to one or more of the fuel circuits 82, 84, 86 in one or more combustors 42. As shown in FIG. 6, the system 110 may include a valve 116 (such as a control valve, a throttle valve, a thermostatic expansion valve, or other suitable flow control device) operably connected to one or more heat exchangers 118, which are used to adjust the temperature of the fuel to one or more of the fuel circuits 82, 84, 86.

Alternately, or in addition, a separate control valve 120 and a heat exchanger 122 may be connected in one or more of the fuel circuits 82, 84, 86 upstream from individual combustors 42 to similarly change the fuel temperature through one or more fuel circuits 82, 84, 86 to one or more combustors 42. In this manner, the temperature of the fuel being directed to the fuel injectors 66, 68 in individual combustors 42 may be changed. Thus, the fuel temperature through one or more fuel circuits 82, 84, 86 and/or to one or more fuel injectors 66, 68 and/or combustors 42 may be varied to change the frequency, phase, amplitude, and/or coherence of the combustion instabilities of one or more combustors 42.

Figure 7:
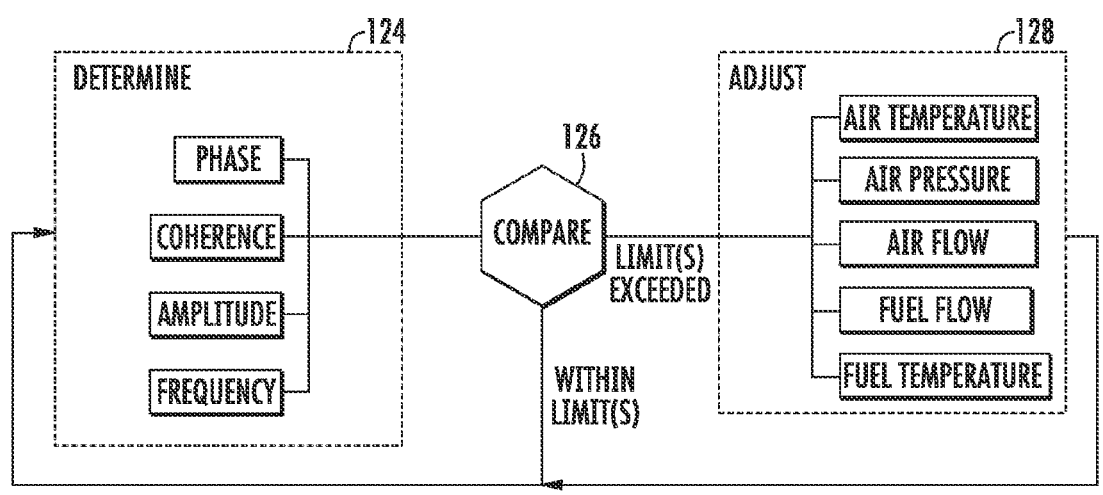
FIG. 7 is an exemplary flow diagram of a method for operating a gas turbine according to various embodiments of the present disclosure.

One of ordinary skill in the art will readily appreciate from the teachings herein that the systems 90, 110 described and illustrated with respect to FIGS. 5 and 6 may provide various methods for the gas turbine 10 to detect the possibility of unwanted vibrations in hot gas path components downstream from the combustion system and/or reduce such unwanted vibrations. FIG. 7 provides an exemplary flow diagram of suitable methods of operating a gas turbine, according to various embodiments of the present invention.

In FIG. 7, at block 124, the method may determine at least one of the frequency, phase, amplitude, or coherence of the one or more combustion instabilities. According to a first aspect of the present disclosure, the method may determine both the frequency and the coherence of one or more combustion instabilities. In another aspect of the present disclosure, the method may determine the frequency, coherence, and amplitude of one or more combustion instabilities. In yet another aspect of the present disclosure, the method may determine the frequency, coherence, and phase of one or more combustion instabilities. In a still further aspect of the present disclosure, the method may determine the frequency, coherence, amplitude, and phase of one or more combustion instabilities.

At block 126, the method may compare the frequency, the coherence, and, optionally, the phase and/or the amplitude, of the one or more combustion instabilities to one or more predetermined limits to determine if there is a likelihood of unwanted vibrations in downstream components. Such unwanted vibrations may result from coherent, in-phase combustion instabilities. In particular embodiments, the method may determine two, three, or all four of the frequency, phase, amplitude, and coherence of the one or more combustion instabilities and compare each to a separate predetermined limit to determine if there is a likelihood of unwanted vibrations in downstream components resulting from coherent, in-phase combustion instabilities.

If one or more of the measured characteristics are actionable relative to their respective predetermined limits, the method may adjust at least one parameter of the gas turbine 10 (as previously described with respect to FIGS. 5 and/or 6) to reduce unwanted vibrations in hot gas path components downstream from the combustion system, as indicated by block 128. For the sake of simplicity, FIG. 7 refers to the comparison as identifying characteristics that are "within limit(s)" or that are "limit(s) exceeded," the latter of which is equivalent to being "actionable." As described above, parameters that may be adjusted include: the temperature of the compressed working fluid produced by the compressor section; the flow rate of the working fluid entering the compressor section; the flow rate of the compressed working fluid recirculated through the compressor section; the flow rate of the fuel directed to at least one fuel injector; and the fuel temperature of the fuel directed to at least one fuel injector.

One of ordinary skill in the art will readily appreciate from the teachings herein that other parameters of the gas turbine 10 may be adjusted to reduce unwanted vibrations in hot gas path components downstream from the combustion system, and the present disclosure is not limited to adjusting any particular parameter, unless specifically recited in the claims. If one or more of the determined characteristics is not actionable relative to the predetermined limits, the method returns to block 124, and the process repeats.

According to one aspect of the present disclosure, at least one parameter of the gas turbine is adjusted when both the frequency and coherence of the combustion instability are actionable relative to their respective limits. In another aspect of the present disclosure, at least one parameter of the gas turbine is adjusted when the frequency, the coherence, and the amplitude of the combustion instability are actionable relative to their respective limits. In still another aspect of the present disclosure, at least one parameter of the gas turbine is adjusted when the frequency, the coherence, and the phase of the combustion instability are actionable relative to their respective limits. In yet another aspect of the present disclosure, at least one parameter of the gas turbine is adjusted when each of the frequency, the coherence, the amplitude, and the phase are actionable relative to their respective limits.

In particular embodiments, the comparisons performed in block 126 may also incorporate a predetermined time limit into the comparison to increase reliability and to reduce false indications of coherent conditions. For example, the comparisons performed in block 126 may also require that the frequency, phase, amplitude, and/or coherence are actionable relative to their respective predetermined limits for a predetermined time interval before triggering any adjustment of the gas turbine 10 to reduce unwanted combustion-driven vibrations in downstream components.

The various embodiments described and illustrated with respect to FIGS. 1-7 may provide one or more of the following advantages over existing systems and methods for operating gas turbines 10. Specifically, changing the temperature, pressure, and/or flow rate of the compressed working fluid 38 and/or the flow rate or temperature of the fuel directed to the combustors 42, alone or in various combinations, may decouple the combustion dynamics and/or reduce coherence of the combustors 42, thereby reducing unwanted vibrations in hot gas path components downstream from the combustion system. As a result, the various embodiments described herein may enhance thermodynamic efficiency, promote flame stability, and/or reduce undesirable emissions over a wide range of operating levels, without detrimentally impacting the life of the downstream hot gas path components.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for operating a gas turbine, the system comprising:
   a. a compressor section configured to receive a working fluid and to produce a compressed working fluid;
   b. a plurality of combustors downstream from the compressor section, each combustor comprising a fuel injector, the fuel injector receiving fuel at a fuel temperature and a fuel flow rate; and
   c. a controller configured to execute logic stored in a memory, the logic causing the controller:
      i. to determine a frequency of a combustion instability and a coherence of the combustion instability;
      ii. to compare the frequency of the combustion instability to a predetermined frequency limit and the coherence of the combustion instability to a predetermined coherence limit; and
      iii. to adjust at least one parameter of the gas turbine if the frequency of the combustion instability is actionable relative to the predetermined frequency limit and the coherence of the combustion instability is actionable relative to the predetermined coherence limit.

2. The system of claim 1, wherein the compressor section further comprises a conduit for recirculating compressed working fluid from a downstream portion of the compressor section to an upstream portion of the compressor section; and wherein the at least one parameter adjusted by the controller is one of a temperature of the compressed working fluid produced by the compressor section of the gas turbine; a flow rate of the working fluid entering the compressor section of the gas turbine; a flow rate of the compressed working fluid recirculated through the compressor section of the gas turbine; the fuel flow rate of the fuel to at least one injector; and the fuel temperature of the fuel to at least one injector.

3. The system of claim 1, wherein the controller is further configured to compare at least one of the frequency and the coherence of the combustion instability to a predetermined time limit.

4. The system of claim 1, wherein the controller is further configured to determine an amplitude of the combustion instability; to compare the amplitude of the combustion instability to a predetermined amplitude limit; and to adjust at least one parameter of the gas turbine if the amplitude of the combustion instability is actionable relative to the predetermined amplitude limit.

5. The system of claim 1, wherein the controller is further configured to determine a phase of the combustion instability; to compare the phase of the combustion instability to a predetermined phase limit; and to adjust at least one parameter of the gas turbine if the phase of the combustion instability is actionable relative to the predetermined phase limit.

6. The system of claim 1, wherein the controller is further configured to determine an amplitude and a phase of the combustion instability; to compare the amplitude of the combustion instability to a predetermined amplitude limit and the phase of the combustion instability to a predetermined phase limit; and to adjust at least one parameter of the gas turbine if at least one of the amplitude of the combustion instability is actionable relative to a predetermined amplitude limit and the phase of the combustion instability is actionable relative to a predetermined phase limit.

7. The system of claim 6, wherein the compressor section further comprises a conduit for recirculating compressed working fluid from a downstream portion of the compressor section to an upstream portion of the compressor section; and wherein the at least one parameter adjusted by the controller is one of a temperature of the compressed working fluid produced by the compressor section of the gas turbine; a flow rate of the working fluid entering the compressor section of the gas turbine; a flow rate of the compressed working fluid recirculated through the compressor section of the gas turbine; the fuel flow rate of the fuel to at least one injector; and the fuel temperature of the fuel to at least one injector.

8. The system of claim 6, wherein the controller is further configured to compare at least one of the frequency, the coherence, the amplitude, and the phase of the combustion instability to a predetermined time limit.

9. A method for operating a gas turbine, the method comprising:
   a. determining a frequency of a combustion instability;
   b. comparing the frequency of the combustion instability to a predetermined frequency limit;
   c. determining a coherence of the combustion instability;
   d. comparing the coherence of the combustion instability to a predetermined coherence limit; and
   e. adjusting at least one parameter of the gas turbine if the frequency of the combustion instability is actionable relative to the predetermined frequency limit, and the coherence of the combustion instability is actionable relative to the predetermined coherence limit.

10. The method of claim 9, wherein the gas turbine comprises a compressor section for compressing a working fluid to produce a compressed working fluid and a conduit for recirculating compressed working fluid from a downstream portion of the compressor section to an upstream portion of the compressor section; wherein the gas turbine further comprises a plurality of combustors, each combustor comprising at least one fuel injector; and wherein the method further comprises adjusting the at least one parameter of the gas turbine, the at least one parameter being one of a temperature of the compressed working fluid produced by the compressor section of the gas turbine; a flow rate of the working fluid entering the compressor section of the gas turbine; a flow rate of the compressed working fluid recirculated through the compressor section of the gas turbine; a fuel flow rate of a fuel to the at least one fuel injector; and a fuel temperature of the fuel to the at least one fuel injector.

11. The method of claim 9, further comprising: comparing at least one of the frequency and the coherence of the combustion instability to a predetermined time limit.

12. The method of claim 9, further comprising: determining an amplitude of the combustion instability; comparing the amplitude of the combustion instability to a predetermined amplitude limit; and adjusting at least one parameter of the gas turbine if the amplitude of the combustion instability is actionable relative to the predetermined amplitude limit.

13. The method of claim 9, further comprising: determining a phase of the combustion instability; comparing the phase of the combustion instability to a predetermined phase limit; and adjusting at least one parameter of the gas turbine if the phase of the combustion instability is actionable relative to the predetermined phase limit.

14. The method of claim 9, further comprising: determining an amplitude and a phase of the combustion instability; comparing the amplitude of the combustion instability to a predetermined amplitude limit and the phase of the combustion instability to a predetermined phase limit; and adjusting at least one parameter of the gas turbine if at least one of the amplitude of the combustion instability is actionable relative to a predetermined amplitude limit and the phase of the combustion instability is actionable relative to a predetermined phase limit.

15. The method of claim 14, wherein the gas turbine comprises a compressor section for compressing a working fluid to produce a compressed working fluid and a conduit for recirculating compressed working fluid from a downstream portion of the compressor section to an upstream portion of the compressor section; wherein the gas turbine further comprises a plurality of combustors, each combustor comprising at least one fuel injector; and wherein the method further comprises adjusting the at least one parameter of the gas turbine, the at least one parameter being one of a temperature of the compressed working fluid produced by the compressor section of the gas turbine; a flow rate of the working fluid entering the compressor section of the gas turbine; a flow rate of the compressed working fluid recirculated through the compressor section of the gas turbine; a fuel flow rate of a fuel to the at least one fuel injector; and a fuel temperature of the fuel to the at least one fuel injector.

16. The method of claim 14, further comprising: comparing at least one of the frequency, the coherence, the amplitude, and the phase of the combustion instability to a predetermined time limit.

* * * * *